United States Patent Office
3,000,857
Patented Sept. 19, 1961

3,000,857
HEAT AND LIGHT STABILIZATION OF SOLID POLYPROPYLENE
William J. Craven, Elizabeth, N.J., assignor to Esso Research and Engineering Company, a corporation of Delaware
No Drawing. Filed Oct. 26, 1959, Ser. No. 848,519
3 Claims. (Cl. 260—45.95)

This invention relates to an improved method of stabilizing solid polymers against heat and light degradation. More particularly it relates to the prevention of this type of degradation in alpha olefin solid hydrocarbon polymers prepared by the so-called low pressure process by the utilization of a synergistic combination of minor amounts of di-t-butyl-p-cresol and 2,2'-dihydroxy-4-octoxybenzophenone.

The low pressure polymerization of alpha olefins with catalyst systems made up of a partially reduced, heavy, transition metal halide and a reducing metal-containing compound to high density, often isotactic, high molecular weight, solid, relatively linear products has been assuming ever increasing importance and is now well known.

It is necessary to stabilize the polymers against heat aging and light degradation. Light instability causes the development of surface cracks, discoloration and brittleness in sheets and pads. Similar difficulties plus loss of tensile strength are found in fibers. Many conventional additives for these purposes have been found ineffective in these polymers. Additionally the utilization of multiple additives has resulted in many cases in an inhibiting effect of one on the other.

It has now been found that these polymers can be stabilized and degradation prevented by incorporating in them synergistic combinations of minor amounts of di-t-butyl-p-cresol and 2,2'-dihydroxy-4-octoxybenzophenone. The utilization of both of these components in combination results in a stabilizing effect far in excess of that obtained by other combinations of components and a markedly improved product.

Di-t-buyl-p-cresol and 2,2'-dihydroxy-4-octoxybenzophenone are each utilized in an amount in the range of about 0.1 to 1.5 wt. percent based on the polymers. These materials can be incorporated by adding them to the powdered, dry polymer in an acetone or alcohol solution and extruding the mixture to pellets. They also can be added of themselves directly to the powder in a Henschel blending appartus. Another method is to dust the solid onto pellets of the resin and extrude the mixture.

The alpha olefinic feeds utilized in polymerization to solid polymers include ethylene, propylene, butene-1, heptene-1, dodecene-1, etc., with propylene preferred.

For the purpose of convenience details of the low pressure catalytic process and the products obtained thereby are presented below, although it should be realized that these by themselves constitute no part of this invention. The process is described in the literature, e.g. see U. K. Patent 810,023, and "Scientific American," September 1957, page 98 et seq.

In the process the polymers are prepared by polymerizing the monomer with the aid of certain polymerization catalysts. The catalysts are solid, insoluble, reaction products obtained by partially reducing a heavy metal compound usually the halide of a group IV–B, V–B and VI–B metal of the periodic system, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see copending U.S. application Serial No. 578,198, filed April 6, 1956 and Serial No. 766,376, filed October 19, 1958.) The product is then activated with an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent for deashing such as acetylacetone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The polymers produced have molecular weights in the range of about 50,000 to 300,000 or even as high as 3,000,000 as determined by the intrinsic viscosity method using the I. Harris Correlation (J. Polymer Science, 8 361, 1952). The polymers can have a high degree of crystallinity and a low solubility in n-heptane.

It is to be understood that the term "low pressure" polymer as used herein connotes material prepared in the indicated manner.

This invention and its advantages will be better understood by reference to the following examples.

*Example 1*

Various formulations of identical low pressure polypropylene resins prepared by using an aluminum triethyl activated aluminum-reduced $TiCl_4$ catalyst were made up utilizing various quantities of additives as indicated. The additives were utilized in an amount of 0.2 wt. percent each based on the polymer. In addition to the additives of this invention glycerine and 2,2' methylene bis (4-methyl-6-t-butyl phenol) were employed for comparison purposes. The tests are as follows. Fibers of a uniform denier are prepared from the resin-additive combination on a fiber-making apparatus. The fiber tenacity (grams/denier) and elongation to break are determined prior to the aging study. Similar fiber samples are wound on racks and placed in a standard fadeometer. Samples of uniform length (1.5 meters) are withdrawn at intervals and their tenacity followed as a function of exposure time. When pads are used, standard size tensile bars are cut from the pads and their loss in tensile from that of the control followed as a function of outdoor exposure time. The results after exposure to ultra violet light for the indicated periods are tabulated below:

| Component I | Component II | U.V. Exposure, Hours | Percent Loss in Fiber Strength |
|---|---|---|---|
| 2,2'-methylene bis (4-methyl-6-t-butyl phenol)—Glycerine. | None | 120 | 50 |
| 2,2'-methylene bis (4-methyl-6-t-butyl phenol). | 2,2'-dihydroxy-4-octoxybenzophenone. | 100 | 70 |
| 2,2'-methylene bis (4-methyl-6-t-butyl phenol)—di-t-butyl-p-cresol. | None | 100 | 55 |
| di-t-butyl-p-cresol | 2,2'dihydroxy-4-octoxybenzophenone. | 120 | 0 |
| Do | 2,2'-dihydroxy-4-methoxybenzophenone.[1] | 95 | 50 |
| Do | 2-methoxy-4-chlorobenzophenone.[2] | 95 | 47 |

[1] 1.0 wt. percent.
[2] 0.5 wt. percent

These results show that the combination of components of this invention resulted in no loss in fiber strength. On the other hand the elimination of 2,2'-dihydroxy-4-octoxybenzophenone or substitution therefor of related compounds resulted in fiber strength loss of at least about 50%. A combination of 2,2'-dihydroxy-4-octoxybenzophenone, however, with another conventional additive such as 2,2'-methylene bis (4-methyl-6-t-butyl phenol) resulted in a loss in fiber strength of 70%.

*Example 2*

An outdoor aging test was run on tensile bars containing 0.2 wt. percent additive. The results tabulated below also demonstrate the synergistic effect of both components of this invention.

| Component I | Component II | Outdoor Exposure Time (mos.) | Percent Loss in Tensile |
|---|---|---|---|
| di-t-butyl-p-cresol | 2,2'-dihydroxy-4-octoxybenzophenone. | 6 | 0 |
| Do | None | 6 | 70 |

The advantages of this invention will be apparent to those skilled in the art. Polymer stabilization is secured in an efficient and economical manner.

It is to be understood that this invention is not limited to the specific examples which have been offered merely as illustrations and that modifications may be made without departing from the spirit of the invention.

What is claimed is:

1. In a method of stabilizing against oxidative and light degradation an alpha olefin, solid polypropylene polymer prepared in the presence of a catalyst containing a partially reduced, heavy, transition metal halide, the improvement which comprises incorporating in the polymer a synergistic combination of a minor amount of both di-t-butyl-p-cresol and 2,2' - dihydroxy-4-octoxybenzophenone.

2. The method of claim 1 in which the di-t-butyl-p-cresol and 2,2'-dihydroxy-4-octoxybenzophenone are each utilized in an amount of about 0.1 to 1.5 wt. percent based on the polymer.

3. A composition of matter comprising a solid polypropylene, low pressure polymer prepared by utilizing a partially reduced, heavy, transition metal halide catalyst, admixed with a synergistic combination of a minor amount of both di-t-butyl-p-cresol and 2,2'-dihydroxy-4-octoxybenzophenone.

References Cited in the file of this patent
UNITED STATES PATENTS 2,852,488    Clark et al.    Sept. 16, 1958
2,853,521    Hardy et al.    Sept. 23, 1958